US008287241B2

(12) United States Patent
Strohl et al.

(10) Patent No.: US 8,287,241 B2
(45) Date of Patent: Oct. 16, 2012

(54) TURBINE BLADE PLATFORM TRAILING EDGE UNDERCUT

(75) Inventors: James Page Strohl, Stuart, FL (US); David Parker, Palm Beach Gardens, FL (US)

(73) Assignee: Alstom Technology Ltd, Baden (CH)

( * ) Notice: Subject to any disclaimer, the term of this patent is extended or adjusted under 35 U.S.C. 154(b) by 847 days.

(21) Appl. No.: 12/275,911

(22) Filed: Nov. 21, 2008

(65) Prior Publication Data

US 2010/0129228 A1 May 27, 2010

(51) Int. Cl.
*B64C 11/16* (2006.01)

(52) U.S. Cl. .................... 416/239; 416/96 R; 416/97 R; 416/190

(58) Field of Classification Search .................. 416/239, 416/96 R, 97 R, 190, 193 A
See application file for complete search history.

(56) References Cited

U.S. PATENT DOCUMENTS

| | | | | |
|---|---|---|---|---|
| 5,947,687 | A | 9/1999 | Mori | |
| 6,390,775 | B1 | 5/2002 | Paz | |
| 6,761,536 | B1 | 7/2004 | Bash | |
| 6,951,447 | B2 * | 10/2005 | Cherolis et al. ........... | 416/193 A |
| 2004/0213672 | A1 | 10/2004 | Gautreau | |

* cited by examiner

*Primary Examiner* — Thinh T Nguyen
(74) *Attorney, Agent, or Firm* — Shook, Hardy & Bacon L.L.P.

(57) ABSTRACT

A gas turbine blade having reduced stresses around a regions where the airfoil training edge joins the platform is disclosed. The lower stresses are achieved due to an undercut region proximate the blade trailing edge being placed in the platform. The undercut region has a compound fillet radius formed from two single and tangent radii where the first radius closer to the airfoil is larger than the second radius such that a ratio of R1/R2 is approximately 2.0 to 2.5.

6 Claims, 4 Drawing Sheets

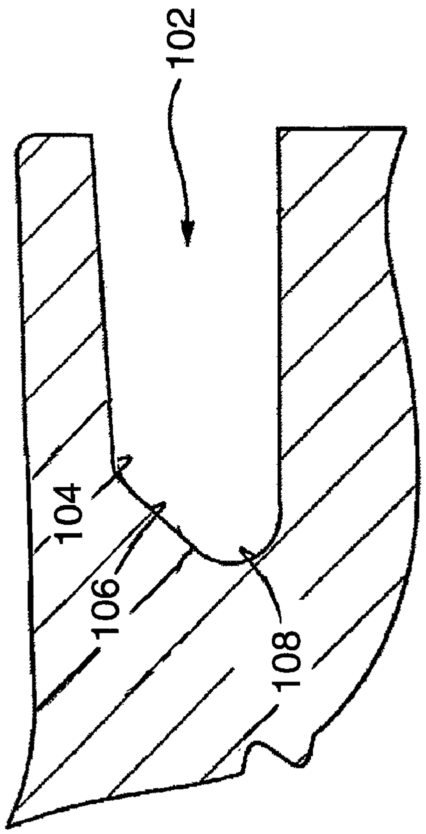
FIG. 2 – PRIOR ART
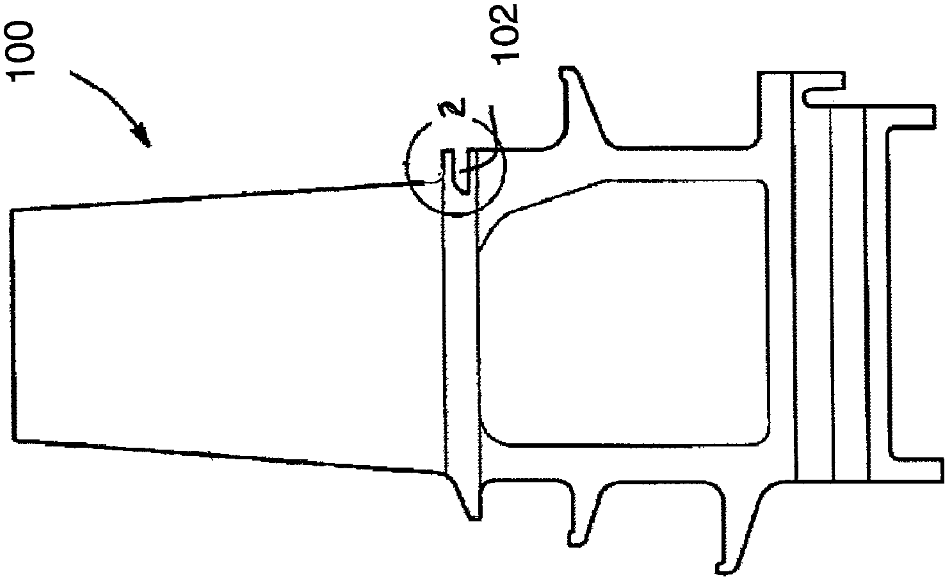
FIG. 1 – PRIOR ART

TURBINE BLADE PLATFORM TRAILING EDGE UNDERCUT

TECHNICAL FIELD

The present invention generally relates to reducing stress levels in turbine blades. More specifically, a compound fillet undercut is located in the aft portion of a platform of the turbine blade to redirect stresses away from the joint between the airfoil trailing edge and the platform

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

The air and hot combustion gases are directed through a turbine section by turbine blades and vanes. These blades and vanes are subject to extremely high operating temperatures and stresses. One such region of high stresses is the joint between the airfoil and the blade platform/root area, especially near the airfoil root trailing edge. Due to the mechanical loading on the airfoil, the blade undergoes large bending and vibratory stresses.

SUMMARY

In accordance with the present invention, there is provided a novel configuration for a turbine blade that reduces stress in the trailing edge region of the airfoil. An undercut is placed in the trailing edge region of the platform, under the trailing edge of the airfoil. The undercut has a compound fillet to lower stresses in the undercut itself while also serving to redirect the stress loads away from the airfoil trailing edge.

In an embodiment of the present invention, a gas turbine blade comprises an attachment portion, a root portion, a platform portion, and an airfoil portion. The platform portion has an undercut extending between the sidewall faces of the platform with the undercut having a compound fillet radius. The compound fillet radius is formed from two single and tangent fillets. In an alternate embodiment, the two single fillets are different in size with the first radius greater than the second radius and having a ratio of R1/R2=2.0-2.5.

In yet another embodiment, a method of redirecting stress fields away from a trailing edge of a turbine blade is disclosed. The method includes undercutting a portion of the platform trailing edge region where the undercut includes a first and second radius tangent at one end forming a compound fillet radius and a pair of generally parallel walls connecting the first and second radius to an aft face of the platform.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 1 is an elevation view of a turbine blade of the prior art;

FIG. 2 is a detailed elevation view of a turbine blade of the prior art;

DETAILED DESCRIPTION

Figure 3:
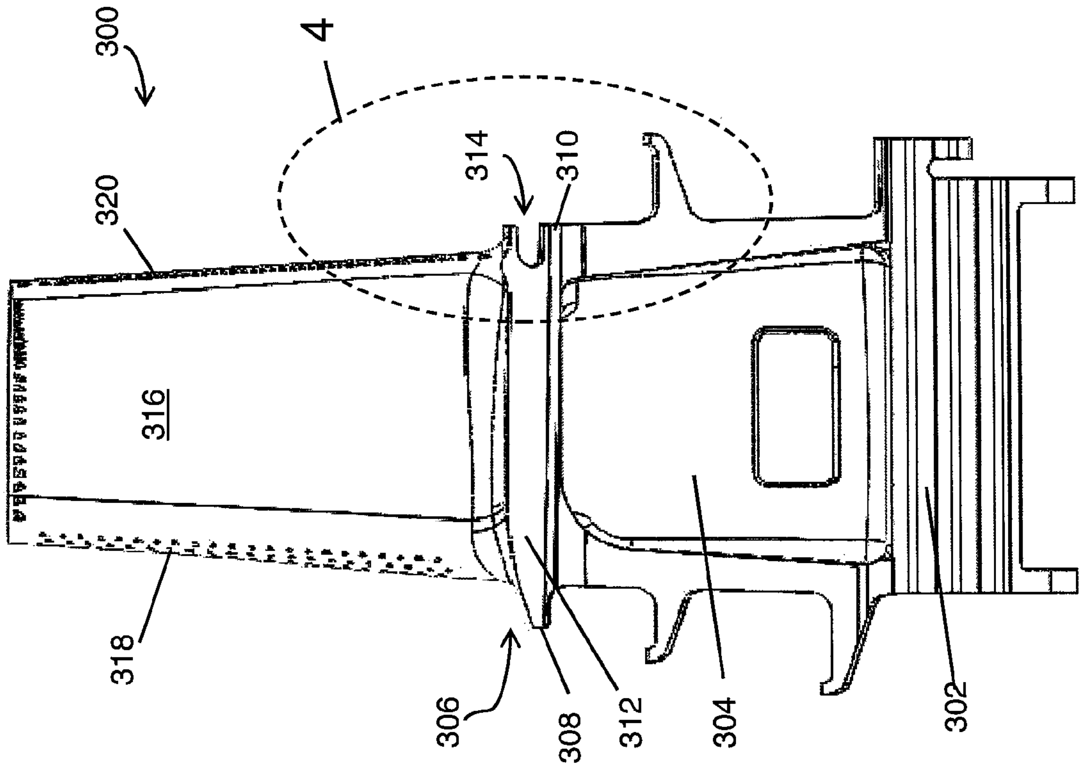
FIG. 3 is an elevation view of a turbine blade in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Referring initially to FIGS. 1 and 2, a gas turbine blade in accordance with the prior art is disclosed. The prior art blade 100 has an undercut 102 located near the trailing edge of the platform. The undercut has a single radius 104 connected to a straight leg portion 106 which is connected to a compound fillet 108.

Figure 4:
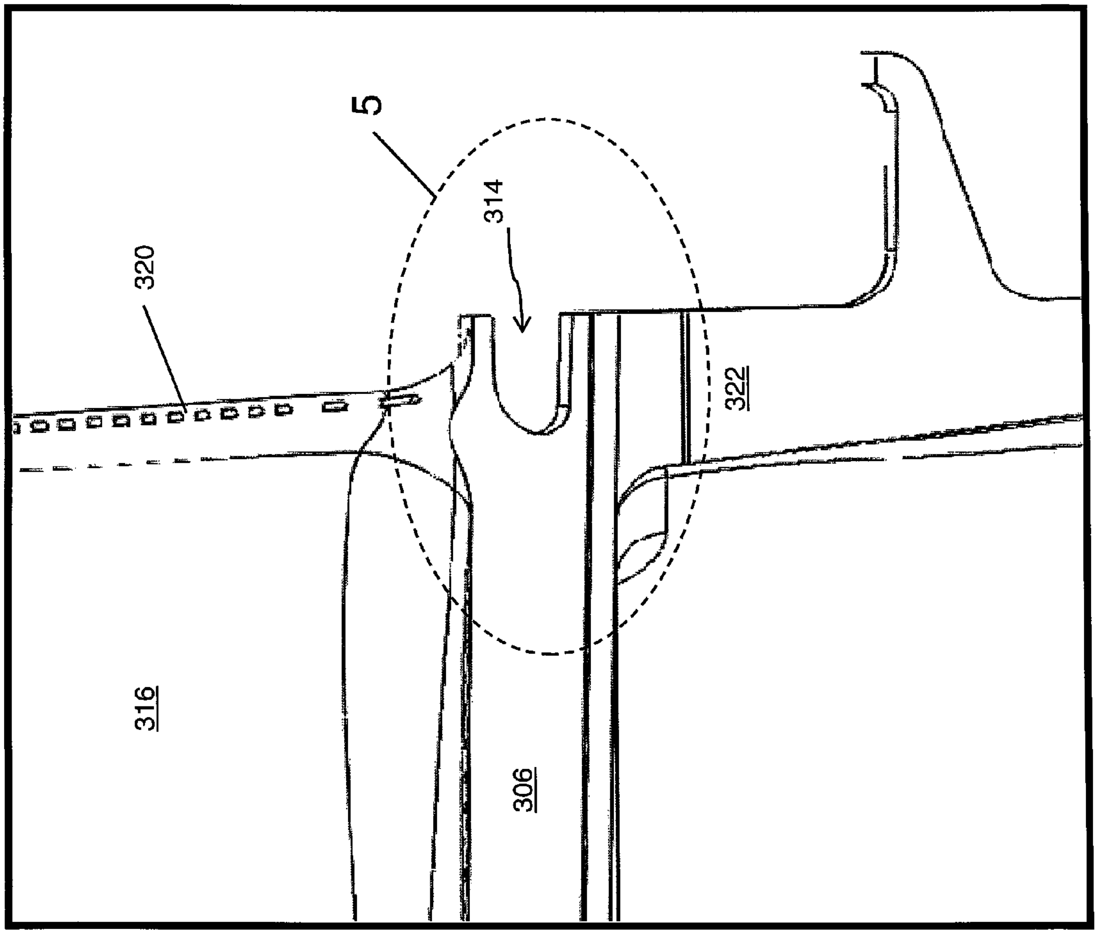
FIG. 4 is a detailed elevation view of a portion of the turbine blade of FIG. 3, in accordance with an embodiment of the present invention; and, FIG. 5 is a detailed cross section of the undercut portion of the platform in accordance with an embodiment of the present invention.
Figure 5:
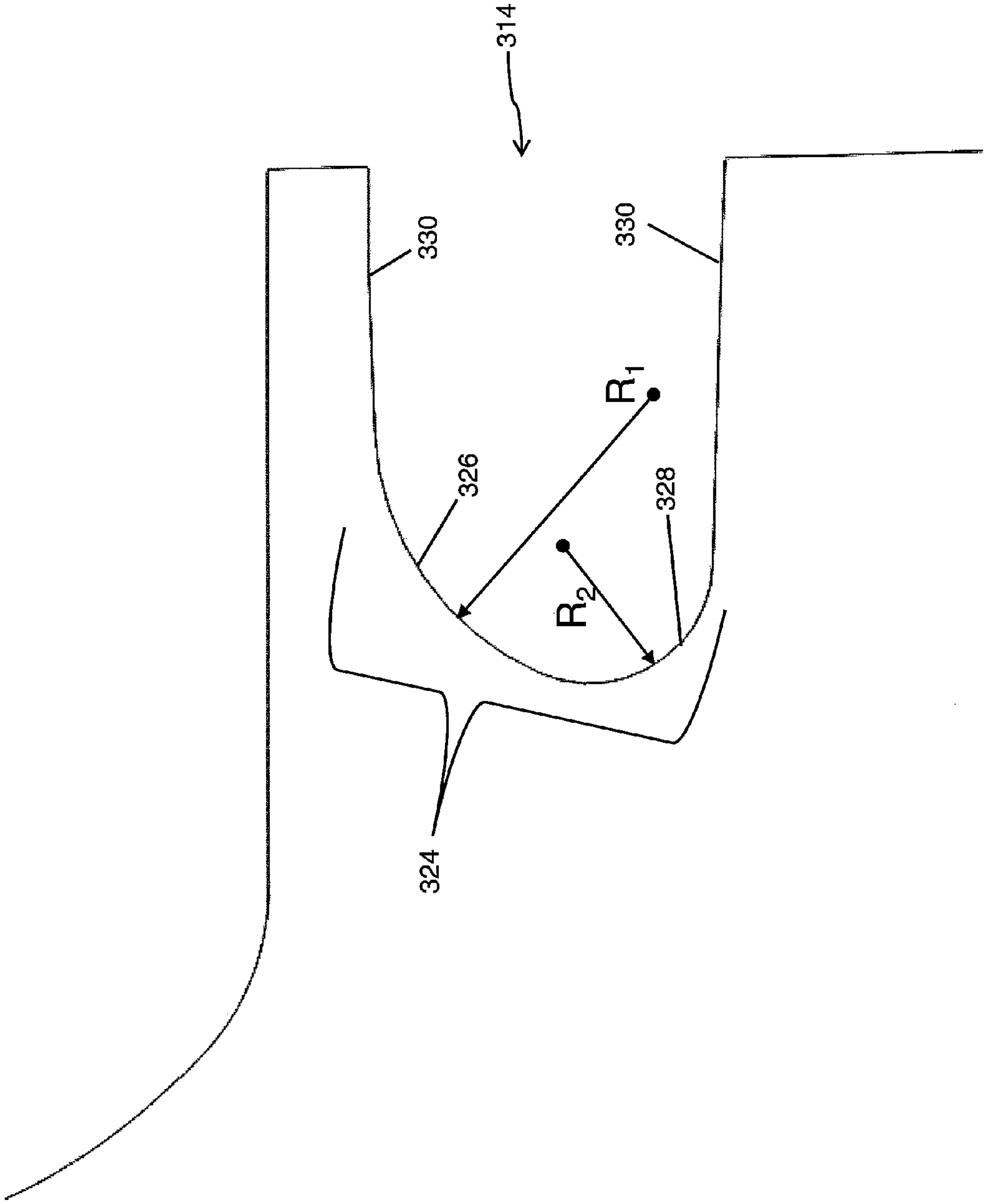

The present invention is depicted in FIGS. 3-5. A gas turbine blade 300 comprises an attachment portion 302, a root portion 304 extending radially outward from the attachment portion 302. A platform 306 extends radially outward from the root portion 304, and has a leading edge face 308, a trailing edge face 310 opposite the leading edge face 308, and a pair of generally parallel sidewall faces 312. The platform 306 also includes an undercut 314 that extends forward from the trailing edge face 310 and between the sidewall faces 312. The undercut 314 can be seen in more detail in FIGS. 4 and 5. Extending radially outward from the platform 306 is an airfoil 316 which has a leading edge 318 and a trailing edge 320.

Referring to FIGS. 4 and 5, the undercut 314 extends to a location radially beneath the trailing edge 320 of the airfoil 316. Extending the undercut 314 to this location under the trailing edge 320 redirects thermal stresses in the buttress area 322 of the root 304 away from the joint between the airfoil trailing edge 320 and platform 306. The undercut 314 also improves the flexibility of the region for thermal strains and shields the trailing edge location of the platform 306 from mechanical loads.

Referring to FIG. 5, the undercut 314 has a compound fillet radius 324 at its closed end. The compound fillet radius 324 is formed from two single and tangent fillets 326 and 328 where fillet 326 has a first radius R1 and fillet 328 has a second radius R2. In an embodiment of the present invention, the undercut 314 also comprises a pair of generally parallel undercut walls 330. Each of the fillets 326 and 328 are also tangent to the undercut walls 330. As it can be seen from FIG. 5, R1 is larger than R2. A larger radius of curvature adjacent to the interface between the airfoil trailing edge 320 and platform 306 provides for a better distribution of stresses and eliminate areas of higher stress concentrations that can occur around areas of a smaller radius curvature, since higher stresses are common at the joint of the airfoil 316 and platform 306. In an embodiment of the present invention, first radius R1 ranges between approximately 0.26 inches and 0.30 inches, while the second radius R2 ranges between approximately 0.12 inches and 0.13 inches. These ranges will vary depending on the exact blade configuration, but are generally a function of the turbine blade geometry, material type, operating temperatures and stress limitations.

In an alternate embodiment of the present invention, the compound fillet 324 can also be expressed in terms of a ratio of the first and second radii. Specifically, R1/R2 can range between approximately 2.0 and 2.5. The prior art design used a straight wall portion between the two fillets to direct the stress to the lower fillet. However, significantly lower stresses in the undercut 324 can be achieved by utilizing the compound fillet 324 without any straight wall portion between the two fillets 326 and 328. Specifically, the present invention achieves an approximately 20% reduction in stresses in the compound fillet 324 compared to the prior art.

In yet another embodiment of the present invention, a method of redirecting stresses away from a trailing edge of a turbine blade is disclosed. The method comprises undercutting a portion of a platform under a trailing edge of an airfoil where the undercut can be placed in the turbine blade when the turbine blade is cast or the undercut can be later machined into the blade platform. Machining techniques capable of removing material in the undercut include electro-discharge machining (EDM) using a shaped electrode, wire EDM, milling, or ground using an appropriate shaped grinding wheel.

The undercutting process comprises removing a section of the platform proximate the platform trailing edge and extending between the platform sidewall faces, with the undercut having a pair of generally parallel walls that terminate in a compound fillet radius. The compound fillet radius is formed from two tangent single radii, with the first radius being larger than the second radius such that a ratio of first radius to second radius is approximately 2.0 to 2.5.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A gas turbine blade comprising:

an attachment portion;

a root portion extending radially outward from the attachment portion;

a platform extending radially outward from the root portion, the platform having a leading edge face, trailing edge face opposite of the leading edge face, a pair of generally parallel sidewall faces, and an undercut extending between the sidewall faces proximate the trailing edge face, the undercut having a compound fillet radius formed from two single, tangent fillets R1 and R2, wherein the ratio of R1/R2 is approximately 2.0 to 2.5; and, an airfoil extending radially outward from the platform.

2. The turbine blade of claim 1, wherein the undercut extends a distance at least radially underneath the airfoil.

3. The turbine blade of claim 2, wherein each of the single fillets are also tangent to an undercut wall, the undercut walls being generally parallel.

4. The turbine blade of claim 3, wherein the compound fillet radius is formed from a first radius and a second radius, with the first radius larger than the second radius.

5. The turbine blade of claim 4, wherein the first radius is between approximately 0.26 inches and 0.30 inches.

6. The turbine blade of claim 4, wherein the second radius is between approximately 0.12 inches and 0.13 inches.

* * * * *